March 8, 1949.  T. E. LARKIN  2,464,047
CARBURETOR DEICING CONTROL SYSTEM
Filed Sept. 24, 1947
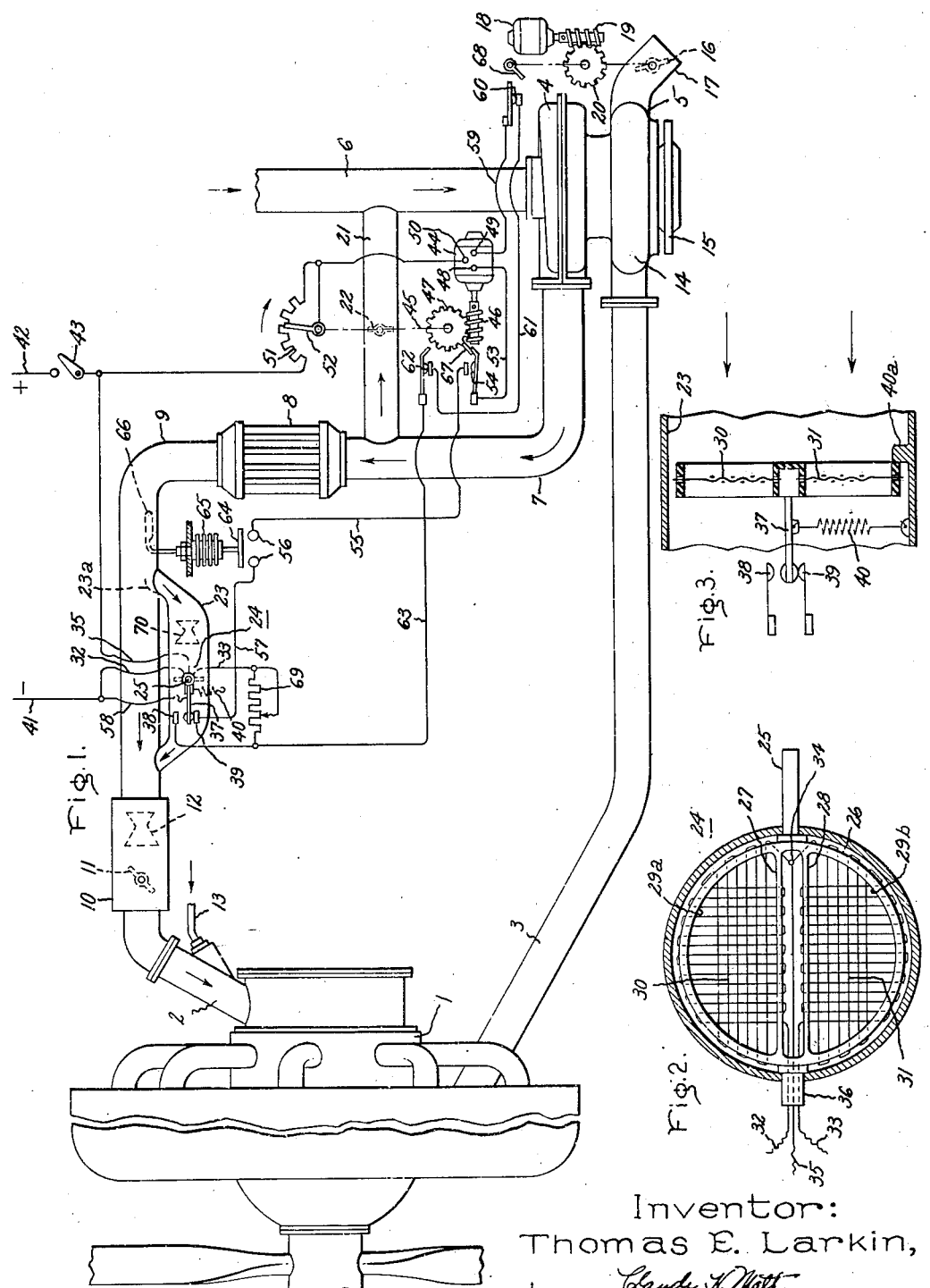
Inventor:
Thomas E. Larkin,
by Claude A. Matt
His Attorney.

Patented Mar. 8, 1949

2,464,047

UNITED STATES PATENT OFFICE 2,464,047

CARBURETOR DEICING CONTROL SYSTEM

Thomas E. Larkin, Schenectady, N. Y., assignor to General Electric Company, a corporation of New York Application September 24, 1947, Serial No. 775,916

8 Claims. (Cl. 123—122)

This invention relates generally to aircraft internal combustion engines and more particularly to apparatus for preventing the formation of ice in the carburetor and other parts of the engine fuel induction system.

It is well known that during certain flight conditions ice may quickly form in the carburetor of an aircraft engine resulting in reduction or complete loss of engine power. Because of this danger, a number of systems have been designed for automatically increasing the temperature of the intake air supplied to the carburetor upon the occurrence of conditions tending to produce ice. In order to sense ice-forming conditions, temperature responsive devices have been used to control the temperature of the carburetor air but these systems have not been generally satisfactory because they do not respond quickly enough to prevent ice formation, nor do they provide an accurate measure of ice-forming conditions.

An object of the present invention is to provide a carburetor de-icing control system which senses ice-forming conditions very rapidly and accurately, thereby giving more complete protection against loss of engine power due to formation of ice in the carburetor or other parts of the fuel induction system.

Another object of the invention is to provide a detector for detecting ice-forming conditions in a moving air stream which is simple, reliable, and quick acting.

A further object is to provide a carburetor de-icing control system which operates in a stable manner and does not cause wide fluctuation of carburetor intake air temperatures.

Further objects and advantages of my invention will become apparent as the following description proceeds and the features of novelty which characterize the invention will be pointed out in particularity in the claims annexed to and forming a part of this specification.

In the drawing,

Fig. 1 is a somewhat schematic representation of a supercharged aircraft internal combustion engine having a carburetor de-icing control system constructed in accordance with the present invention.

Fig. 2 shows constructional details of the detector forming a part of the present invention.

Fig. 3 is a side view of the detector shown in Fig. 2.

Referring to the drawing, I have shown a radial aircraft internal combustion engine I of well known construction, the engine having a fuel intake manifold 2 and an exhaust manifold 3. Pressurized air is supplied to the fuel induction system by means of a turbosupercharger comprising a compressor 4 driven by a gas turbine 5 which is also of well known construction. Air enters the compressor 4 through a conduit 6 where it is compressed and discharged through a conduit 7 which is connected to the intake manifold 2 through an intercooler 8, a conduit 9, and a carburetor 10. The carburetor 10 is shown schematically as comprising the usual throttle valve 11 located downstream from a venturi 12. Fuel is injected into the engine under the control of a fuel injection system of known construction (not shown) controlled in accordance with the pressure drop through the venturi 12 and other control elements not shown, the fuel injection pipe being indicated at 13. The injection may be direct to cylinder head of engine.

The gas turbine 5 is driven by the pressure of the exhaust gases in the exhaust manifold 3 to which it is connected. The turbine has a nozzle box 14 having ports (not shown) through which exhaust gases escape and impinge upon a bucket wheel 15 causing rotation of the wheel and the direct connected compressor. The speed of the turbine and compressor is controlled by the usual wastegate 16 located in a by-pass conduit 17, the position of the wastegate determining the exhaust back pressure applied to the turbine.

The wastegate 16 is connected to be rotatably positioned by means of a reversible motor 18 which is connected to the wastegate through a worm gear 19 and a meshing pinion 20. The motor 18 may form a part of an intake manifold pressure regulator system (not shown) responsive to engine intake manifold pressure or some other control pressure which acts to position the wastegate 16 and thereby control the speed of the gas turbine and compressor so as to maintain some desired pressure condition. The automatic control system may, for example, be of the type shown in Patent 2,376,143 Edwards et al.

During certain conditions of flight, as when passing through clouds or storm areas, ice may tend to form in the carburetor 10 resulting in a clogging of the venturi 12 and a resulting misfunctioning of the fuel injection system causing a loss or failure of engine power. In order to prevent this, it is customary to provide some means for heating the induction air so as to prevent the formation of ice or to melt the ice if it has already started to form. One convenient way to increase the temperature of the carburetor intake air in a supercharged system is to recirculate a part of the compressor discharge air through the compressor so as to increase the compression heating effect. For this purpose there is provided a by-pass conduit 21 interconnecting the discharge conduit 7 and the intake conduit 6, the amount of recirculation being controlled by a valve 22 located in the by-pass conduit. No claim is here made for this method of heating carburetor air since this forms the subject matter of Patent 2,356,370 Allen.

In the arrangement of the Allen patent, supra, the recirculating valve is controlled in accordance with the output of a sensing element responsive to carburetor temperature. Under some conditions of flight, the system of the Allen patent may not operate fast enough or accurately enough to increase the carburetor intake temperature before a substantial amount of ice has been formed in the carburetor.

In accordance with the present invention, I provide a new and improved control system for operating the recirculation valve 22 which operates more quickly and accurately and in a more stable manner than previously known arrangements.

Referring now to the details of my improved system, it will be noted that there is provided a by-pass conduit 23 associated with conduit 9, through which a sample portion of the carburetor intake air is diverted by means of a scoop 23a extending into the conduit 9. Located within the conduit 23 is an ice detector unit indicated generally at 24. The detector unit comprises a rotatable shaft 25 which extends through diametrically opposite holes in the conduit 23 in which the shaft is journaled. Mounted on the shaft 25 within the conduit 23 is a circular frame member 26 across which extend two central bars 27 and 28 forming with the outer edges of the frame 26 two semi-circular openings 29a and 29b. The openings 29a and 29b are covered by screens 30 and 31 formed by interweaving insulated electrical heating wires. A flexible lead 32 is connected to one end of the wire forming screen 30 and a flexible lead 33 is connected to one end of the wire forming screen 31. The other ends of the wires forming screens 30 and 31 have a common junction 34 connected to a flexible lead 35. The leads 32, 33 and 35 are threaded through a hollow extension 36 of the shaft 25 as shown.

The frame 26 is made nearly as large as the internal diameter of the conduit 23 so that when the frame is in the vertical position shown, the screens 30 and 31 cover most of the internal cross-sectional area of the conduit 23 through which the sample portion of the carburetor intake air passes. It will be noted that the screens 30 and 31 are offset relative to the rotational axis of the shaft 25, and due to the drag forces of the air passing through the screens, there are torques produced associated with screens 30 and 31 which tend to rotate the shaft 25 in opposite directions. Preferably the screens 30 and 31 are of equal area and are located equidistant from the rotational axis of the shaft 25 so that these torques tend to counteract and balance each other in the absence of a factor tending to increase the air drag resistance of one of the screens such as may be caused by the formation of ice thereon as will subsequently be more fully described.

Rigidly connected to the rotatable shaft 25 of the detector is an electrically conducting contact arm 37, the outer end of which is adapted selectively to engage relatively fixed spaced contacts 38 and 39. A light tension spring 40 extending between the contact arm 37 and the conduit 23 acts to bias the detector in a counterclockwise direction to the vertical position shown in which the frame 26 engages a fixed stop 40a. In this position the contact arm 37 engages the stationary contact 39 as shown.

As best shown in Fig. 1 of the drawing, the flexible lead 32 of the screen 30 is connected to one side, for example, the negative side, of a direct current power supply indicated at 41. This power supply may, for example, be the 24 volt D.-C. supply customarily available on aircraft. The common lead 35 is connected to the positive side of the power supply, indicated by the lead 42, through a control switch 43. Thus it will be clear that whenever the control switch 43 is closed, a circuit is completed for energizing the heater wires forming the screen 30, causing local heating of the screen. This heating of the screen 30 prevents formation of ice thereon whenever the system is in operation. The lower screen 31 is normally unheated so that ice may form thereon during certain atmospheric conditions. When this happens, an unbalance in the drag forces applied to the screens 30 and 31 occurs, this unbalance being sufficient to overpower the biasing force of the light tension spring 40 and cause a clockwise rotation of the detector whereupon contact arm 37 disengages contact 39 and engages contact 38.

In order to provide means for operating the recirculation valve 22 in accordance with the position of the detector unit 24, there is provided a reversible motor 44 which drives a valve shaft 45 connected to valve 22 through a worm gear 46 mounted on the motor shaft meshing with a pinion 47 carried on the valve shaft. The motor 44, which may be a split series type of well known construction, has forward and reverse field connections 48 and 49 and an armature connection 50. The armature connection 50 is connected to the positive power supply line 42 through a potentiometer 51 and the control switch 43. The potentiometer 51 has a slider 52 mounted on the extension of the valve shaft 45 and it is arranged in such a way that as the motor moves the valve 22 toward the open position, the potentiometer acts to increase the resistance in the motor armature circuit.

It will be assumed that when the motor connection 48 is connected to the power supply line 41, the motor runs in a direction to close valve 22, and when the connection 49 is connected to the power supply line 41, the motor runs in a direction to open the valve. The motor terminal 48 is arranged to be connected to the supply line 41 through a circuit which may be traced as follows: Connection 48, a wire 53, a normally closed limit switch 54, a wire 55, normally open switch contacts 56, a wire 57, contact 39, contact arm 37, flexible lead 58 to power supply line 41. The connection 49 of the motor 44 is arranged to be connected to the power supply lead 41 through a circuit which may be traced as follows: Connection 49, a wire 59, a normally closed interlock switch 60, a wire 61, a normally closed limit switch 62, a wire 63, contact 38, contact arm 37, and flexible lead 58 to the power supply line 41.

The normally open switch contacts 56 are arranged to be closed by a bridging member 64 which is fastened to and positioned by a thermal bellows 65. The thermal bellows 65, which may be a well known liquid filled type, has connected thereto a temperature bulb 66 which extends into the conduit 8 so as to be affected by the temperature of the intake air supplied to the carburetor 10. The arrangement is such that when the carburetor intake air reaches a predetermined value, such as, for example, 50 degrees F., the bellows 65 expands moving the bridging arm 64 downwardly and closing the contacts 56.

The limit switches 54 and 62 are connected in the close valve and open valve circuits of the motor 44 and function to prevent overtravel of the valve 22. The switch 62 is opened by an operating member 67 carried on valve shaft 45 when the valve reaches the open position and the switch 54 is opened by the member 67 when the valve reaches the closed position.

The switch 60 acts as an additional interlock in the valve opening motor circuit for preventing operation of the valve 22 in the opening direction when the wastegate 16 is moved to the fully closed position by the motor 18. For this purpose there is provided a cam 68 mounted on the drive shaft for the wastegate 16, the cam 68 acting to open switch 61 when the wastegate approaches the closed position. The purpose of this additional interlock switch 60 will become apparent as the description proceeds.

The operation of my improved carburetor de-icing control system will now be described.

To place the system in operation, the switch 43 is closed. Normally the detector unit 24 occupies the position shown in which the contact arm 37 engages the stationary contact 39. It will be assumed that this has caused motor 44 to drive the valve 22 in the closing direction until it reaches a closed position shown in which the member 67 opens the limit switch 54 thereby de-energizing the motor.

It will now be assumed that flight conditions are changed suddenly so that the carburetor intake air flowing through the conduit 9 becomes sufficiently cold to cause formation of ice. Since a part of the carburetor intake air is diverted through the conduit 23, a formation of ice will begin on the lower screen 31. During this time no ice will form on the upper screen 30 because of the fact that the electric heating wires comprising the screen 30 are electrically heated. The formation of ice on the lower screen 31 increases the resistance to the flow of air therethrough, whereby a torque unbalance occurs which causes the frame 26 and the shaft 25 to rotate clockwise until the contact arm 37 moves away from contact 39 and engages contact 38. The engagement of the contact arm 37 and the stationary contact 38 completes the energizing circuit which causes the motor 44 to drive the recirculation valve 22 in a direction to open the by-pass conduit 21. The opening of the by-pass conduit 21 permits a portion of the compressor discharge air to be recirculated through the compressor thereby increasing the temperature of the compressor discharge air supplied to the carburetor intake conduit 9.

If no additional control is provided, the increase in temperature of the carburetor intake air will eventually melt the ice on the screen 31 and permit the tension spring 40 to return the detector to the normal position in which a circuit is established to close the recirculation valve 22. However, due to the fact that there is a time lag between the operation of the detector 24 and the increase in carburetor temperature, the system may tend to hunt and become unstable. In order to prevent such hunting, I provide an arrangement which acts to restore the detector to the normal position more quickly than would otherwise be the case. In order to accomplish this, I provide a circuit arrangement which causes the lower screen 31 to become electrically heated whenever the detector 24 is rotated to the clockwise, heat-increase position. When the detector is rotated to the clockwise position, an energizing circuit to heat the lower screen 31 is completed which may be traced as follows: Power supply line 42, switch 43, lead 35, the wires forming screen 31, lead 33, an adjustable rheostat 69, wire 63, switch contact 38, contact arm 37, lead 58, to the power supply line 41. Because of the fact that the screen 31 becomes heated after the detector moves to the clockwise heat-increase position, the ice previously formed thereon melts off more quickly than would otherwise be the case, permitting the tension spring 40 to restore the detector to the counterclockwise heat-decrease position. In this manner the arrival of heat to the carburetor is anticipated and any tendency to overshoot is thereby reduced.

If the first cycle of operation of the detector 24 does not result in sufficient opening of the recirculation valve 22 and increase in intake air temperature to stop formation of ice, the cycle will be repeated, resulting in a further opening of the valve 22. The amount which the valve 22 is opened during each cycle of detector operation depends on the length of the detector cycle which may be controlled by adjusting the rheostat 69 which determines the amount of heating in the lower screen 31.

When the detector 24 returns to the normal heat-decrease position, the motor 44 may not immediately drive the recirculating valve 22 back towards the closed position due to the fact that the switch contacts 56 may still be open. The contacts 56 are not closed by the bridging member 64 until the carburetor intake temperature reaches a predetermined value which causes the bellows 65 to expand and lower the bridging member 64 into engagement with the contacts 56.

The potentiometer 51 slows down the speed of operation of the motor 44 as the valve 22 approaches the open position by progressively inserting resistance in the motor armature circuit. In this way the increments of valve opening motion are automatically decreased as the valve opens, thus further anticipating the arrival of heat at the carburetor and stabilizing the control system.

It may sometimes occur that the detector calls for an increase in carburetor heat at the same time the intake manifold pressure regulator calls for an increase in manifold pressure. This condition may lead to an unstable hunting condition because of the fact that a closure of the wastegate 16 and a resulting increase in output of compressor 4 is to a certain extent offset by an opening of the recirculation valve 22. As a result, the wastegate 16 may close completely and the valve 22 may open completely before counteracting control effects can cause a reversal of valve action to take place. To reduce the magnitude of any hunting or overshooting under such conditions, the interlock switch 60 is provided which prevents the valve 22 from opening whenever the wastegate 16 approaches the closed position. This action insures that the intake manifold pressure regulator has operated in a direction to reopen the wastegate 16 before the recirculation valve 22 is permitted to open to increase carburetor heat.

Under some conditions it may be desirable to have the detector operate somewhat in advance of reduction of air temperature to a point where ice forms elsewhere in the fuel induction system. For this purpose a venturi 70 is placed in the conduit 23 on the upstream side of the detector. This venturi will cause a reduction in temperature of the air impinging on the detector so that ice will tend to form on the lower detector screen in advance of formation of ice elsewhere in the fuel induction system. This arrangement insures that the control system will have adequate time to increase the carburetor intake temperature before a dangerous amount of ice forms.

The formation of ice in an engine fuel induction system depends not only upon air intake temperature but also upon air humidity, and other factors. Therefore, my system, which operates in response to actual formation of ice, is much more reliable and accurate than previous systems which respond only to air temperature since ice may or may not form at a given temperature, depending on humidity and other factors. Because of its accuracy and reliability my system permits safe engine operation at carburetor intake temperatures relatively close to the freezing point whereby detonation is avoided and combustion efficiency is improved. Also, because it operates in a stable manner, excessive fluctuation of carburetor intake air temperature is prevented.

It will be understood that my carburetor de-icing control system is not limited in application to the illustrated system in which the carburetor intake air heating is provided by recirculating varying amounts of air through a supercharger. As will be clear to those skilled in the art, other air heating systems may be used, the only requirement being that some means be provided for adjusting the amount of heating which can be controlled by operation of the detector 24.

It will also be clear to those skilled in the art that the detector 24 may be used to operate an indicator either with or without automatic carburetor heat control. While the detector is especially useful in detecting ice-forming conditions in an engine fuel induction system, it may be used wherever indication or control of ice-forming conditions in a moving air stream is desired. For example, the detector may be mounted in the slip stream and used to indicate icing conditions that would cause formation of ice on aircraft wings. In such a case, the detector may also control wing de-icer apparatus.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. Apparatus for preventing the formation of ice in the carburetor of an internal combustion engine to which intake air is supplied comprising a conduit through which at least a portion of said intake air is directed, an ice detector rotatably mounted in said conduit and disposed in the path of air flow therethrough, said detector comprising a screen offset from the rotational axis of said detector, and means for biasing said detector to a normal position in which said screen extends across the path of air flowing through said conduit during non-icing conditions, said biasing means yielding to permit rotation of said detector away from said normal position when the flow through said screen is impeded by formation of ice thereon.

2. Apparatus for preventing the formation of ice in the carburetor of an internal combustion engine to which intake air is supplied comprising a conduit through which at least a portion of said intake air is directed, an ice detector rotatably mounted in said conduit comprising a pair of screens mounted on opposite sides of the rotation axis of said detector and disposed in the path of air flow through said conduit, and means for locally heating one of said screens to prevent the formation of ice thereon during icing conditions causing the formation of ice on the other of said screens whereby a torque is developed during icing conditions causing rotation of said detector away from a normal position.

3. In a system for preventing the formation of ice in the carburetor of an internal combustion engine to which intake air is supplied by heating means controlled by a reversible motor for varying the temperature of said intake air the combination comprising an ice detector having a pair of rotatably mounted screens mounted on opposite sides of the rotational axis thereof and disposed in the path of flow of said intake air, switching means operable by said detector between heat-increase and heat-decrease positions for controlling said motor, said detector normally positioning said switching means in the heat-decrease position, and means for locally heating one of said screens to prevent formation of ice thereon during icing conditions causing formation of ice on the other of said screens whereby a torque is developed during said icing conditions rotating said detector to position said switching means in the heat-increase position.

4. In a system for preventing the formation of ice in the carburetor of an internal combustion engine to which intake air is supplied and heating means controlled by a reversible motor are provided for varying the temperature of said intake air the combination comprising an ice detector having a pair of rotatably mounted screens mounted on opposite sides of the rotational axis thereof and disposed in the path of flow of said intake air, switching means operable by said detector between heat-increase and heat-decrease positions for controlling said motor, said detector normally positioning said switching means in the heat-decrease position, and means for locally heating one of said screens to prevent formation of ice thereon during icing conditions causing formation of ice on the other of said screens whereby a torque is developed during said icing conditions rotating said detector to position said switching means in the heat increase position, and means for locally heating said other screen only when said switching means is in said heat-increase position to cause said detector to return to the normal heat-decrease position in advance of the arrival of sufficient heat from said heating means to melt the ice on said other screen thereby preventing substantial overshooting of the control system.

5. In a system for preventing the formation of ice in the carburetor of an internal combustion engine to which intake air is supplied and heating means controlled by a reversible motor are provided for varying the temperature of said intake air the combination comprising an ice detector having a pair of rotatably mounted screens mounted on opposite sides of the rotational axis thereof and disposed in the path of flow of said intake air, switching means operable by said detector between heat-increase and heat-decrease positions for controlling said motor, said detector normally positioning said switching means in the heat-decrease position, means for locally heating one of said screens to prevent formation of ice thereon during icing conditions causing formation of ice on the other of said screens whereby a torque is developed during said icing conditions rotating said detector to position said switching means in the heat-increase position, and interlocking means actuated in accordance with the temperature of said intake air for preventing operation of said motor in the heat-decreasing direction until said intake temperature reaches a predetermined temperature.

6. A detector for detecting icing conditions in a moving air stream comprising a rotatable member carrying a screen adapted to be disposed in the path of said air stream, said screen being positioned relative to rotational axis of said member so that the drag force of said air stream flowing through said screen tends to rotate said member away from a normal position, biasing means acting on said member to maintain it in said normal position when said screen is clear of ice, said biasing means yielding to permit rotation of said member when said drag force increases due to increased resistance of said screen caused by formation of ice thereon.

7. A detector for detecting icing conditions in a moving air stream comprising a rotatable member carrying a pair of screens adapted to be disposed in the path of said air stream, said screens being mounted relative to the rotational axis of said member so that the drag force of said air stream flowing through said screens produces torques tending to rotate said member in opposite directions, said torques being approximately balanced when said screens are free of ice, and means for heating one of said screens to prevent formation of ice thereon whereby upon formation of ice on the other of said screens the torque produced by said other screen predominates due to the increased drag in said air stream causing rotation of said member thereby providing a quick acting detection of icing conditions in said air stream.

8. A detector for detecting icing conditions in a moving air stream comprising a rotatable member adapted to be positioned in said air stream, said member carrying a pair of screens offset from the rotational axis of said member on opposite sides thereof, one of said screens comprising interwoven electric heating wires and means for conducting electric current to said heating wires to cause heating thereof.

THOMAS E. LARKIN.

REFERENCES CITED

The following references are of record in the file of this patent:

UNITED STATES PATENTS

| Number | Name | Date |
| --- | --- | --- |
| 2,208,689 | Sulzman | July 23, 1940 |
| 2,338,574 | Cunningham | Jan. 4, 1944 |
| 2,356,370 | Allen | Aug. 22, 1944 |
| 2,368,642 | Crago | Feb. 6, 1945 |
| 2,382,365 | Carssow | Aug. 14, 1945 |